Figure 1:
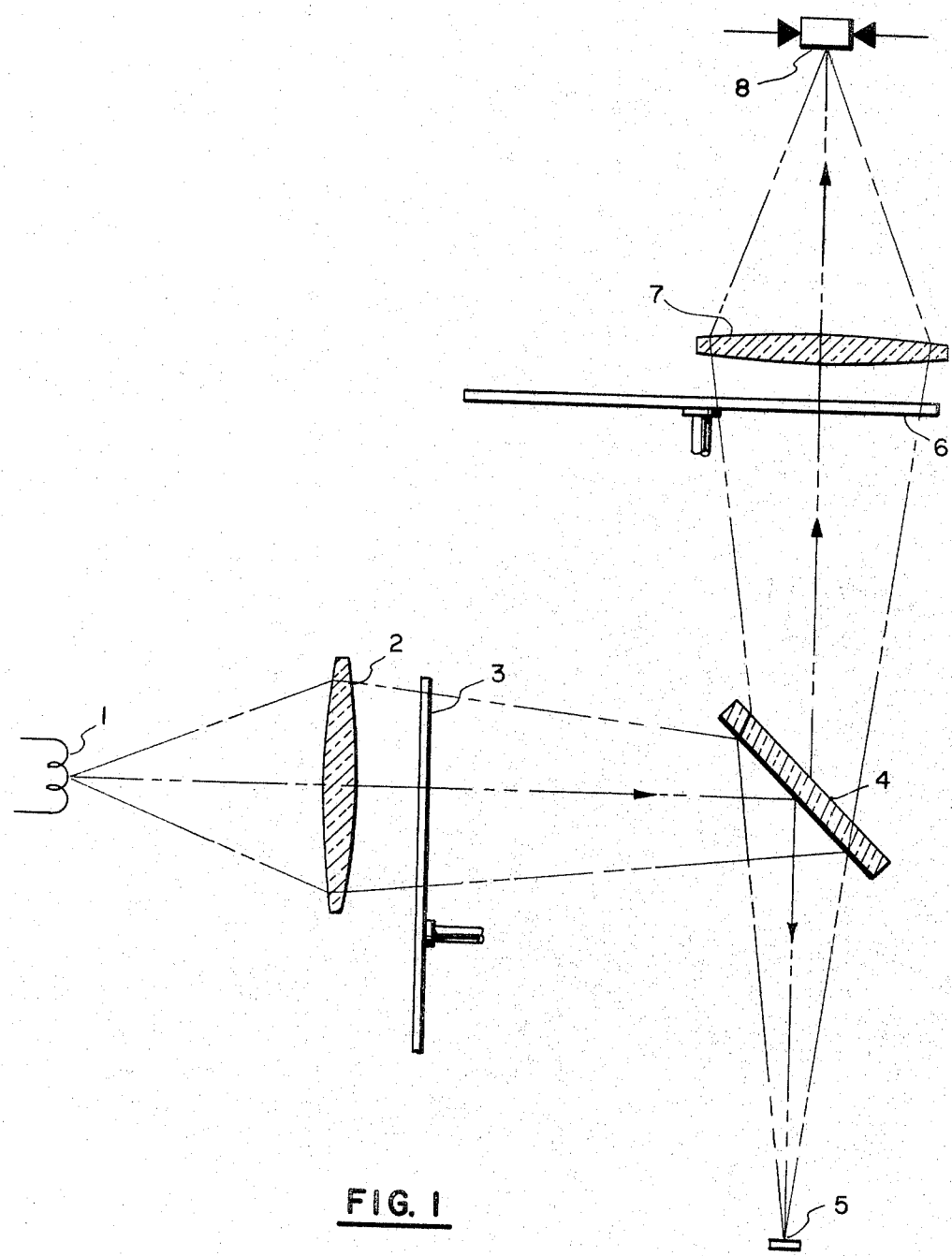

3,336,833
SURFACE ROUGHNESS METER
Philippe Villers, Wilton, Conn., assignor to Barnes Engineering Company, Stamford, Conn., a corporation of Delaware
Filed Oct. 16, 1963, Ser. No. 316,574
6 Claims. (Cl. 88—14)

This invention relates to a surface roughness meter using reflected optical radiations to effect measurement. The problem of measuring surface roughness is a very serious one when the roughness becomes quite small. Ordinarily, surface roughness is measured with a profilometer using a specially designed diamond stylus which is moved across the material. Such measurements have been moderately successful where the RMS roughness is in the range from 50 to 100 microinches or more, and then only with very hard material. The RMS roughness is used in the normal sense in the art, that is to say, the deviation from the average plane of a surface determined by the root mean square method. Roughness itself means variation from an average plane of a surface regardless of whether or not its value is determined by the root mean square method. In the range below 10 $\mu$in. down to .5 $\mu$in., and even somewhat lower, there has been no satisfactory method. It is possible, in a scientific laboratory, to make measurements with interferometers, but the time taken is so long that for practical routine measurements, the cost is prohibitive.

Qualitative measurements between specular reflectance and diffuse reflectance are quite common in the so-called "gloss meters." However, these meters are incapable of giving useful results when the quantitative measurement of the RMS roughness is desired. A gloss meter operates on a comparison of measurements at normal incidence and at an angle. Such measurements are worthless for quantitative purposes, because when the beam strikes at an angle, the reflectance is greatly influenced by the RMS slope of the surface profile of the roughness, and so it is not possible to obtain quantitative results which are generally useful.

A major solution to the problem is described and claimed in the patent of Dreyfus, No. 3,222,978 issued Dec. 14, 1965. This solution involves the measurement by two colors of substantially normal reflection. The basic principle under which the Dreyfus patent operates involves the use of a very long wave length compared to the RMS roughness, the wavelength being at least 10 times the RMS roughness for the beginning of usable results, and preferably considerably longer than 30 times. This seeming defiance of ordinary optical laws, which specify that precision of measurement increases with the shortness of wavelength of the measuring radiation in comparison to the phenomena measured, is due to the fact, which has been discovered, that while the general precision does, in fact, increase exponentially with a term in the exponent involving the square of the ratio between RMS roughness and wavelength, there is an error factor due to RMS slope of the roughness which involves the fourth power of the same ratio. Since a practical machine must be capable of measuring roughness of very different slope angles, the basic limitation which is an important factor in the Dreyfus patent is an essential. There is, also, another limitation, because if the ratio of RMS roughness to wavelength becomes too minute, the actual measurement, which is a ratio between specular reflectance and reflectance from a rough surface, approaches too closely to unity to permit great precision. When this ratio between wavelength and roughness greatly exceeds 120:1, measurement precision begins to fall off.

The present invention may, in general, be considered as a practical instrumental improvement over the basic measurement principle utilized in the Dreyfus patent. The present invention, however, uses a somewhat different, but well known, radiometer for the two-color radiometer of Dreyfus, and also performs an additional function which is not readily achieved by the Dreyfus instrument. These advantages, which constitute the practical improvement on the important advance in roughness measurement which is represented by the Dreyfus invention, will be described in greater detail below.

Essentially, the present invention untilizes a single-color radiometer with a series of ranges of radiation wavelength and electronic processing circuits. It should be noted that while a single-color radiometer is used, the wavelength band for different ranges of RMS roughness measurement will be different, but in each case only a single wavelength band is used. This involves a modification, also, in the order of optical elements over FIG. 1 of the Dreyfus patent. In Dreyfus the chopping is of the reflected beam. In the present invention, the chopping is preferably of the beam before reflection, and the radiometer proper, therefore, does not contain any internal chopper. Further details and modifications of the instrument will be set out below after a description of a specific typical 3-range instrument.

The following table shows four ranges and a reference channel for measuring RMS roughness from 0.5 $\mu$in. to 10 $\mu$in. The basic expression for variation of the ratio of specular reflectance to reflectance from the rough sample is set out in the following equation, on which the tabulated values are based:

$$R_s/R_o = e^{-16\pi^2\sigma^2/\lambda^2}$$

in which $R_s$ is specular reflectance, $R_o$ reflectance observed from a rough sample $\sigma$ is RMS roughness and $\lambda$ wavelength.

TABLE I.—SPECULAR REFLECTANCE VS. ROUGHNESS FOR VARIOUS WAVELENGTHS

| $\sigma$ ($\mu$in.) | Wavelength | | | |
|---|---|---|---|---|
| | 1.5$\mu$ | 4$\mu$ | 8$\mu$ | 10$\mu$ (reference channel) |
| 0.5 | .989 ↑ | | | .9997 |
| 1 | .955 range 1 | | | .9986 |
| 1.5 | .905 ↓ | .985 | | .997 |
| 2 | .837 | .975 ↑ | | .995 |
| 3 | | .950 range 2 | .985 | .99 |
| 4 | | .905 ↓ | .975 | .984 |
| 5 | | .855 | .961 ↑ | .975 |
| 6 | | .800 | .945 range 3 | .966 |
| 8 | | | .903 | .937 |
| 10 | | | .852 ↓ | .905 |

The ratios shown are determined by potentiometer settings, the potentiometer having suitable scales reading directly in RMS roughness. The fourth power slope error is negligible for measurements in all of the ranges, as will be seen in the following table:

TABLE II.—REFLECTANCE RATIOS VS. WAVELENGTH $$\left[\text{Using } R_s = R_o e^{-16\pi^2 \sigma^2/\lambda^2} \text{ and } \Delta R_s = \frac{3117}{m^2} R_o \left(\frac{\sigma}{\lambda}\right)^4 (\Delta\theta)^2\right]$$

| RMS Finish/Wavelength | | | | |
|---|---|---|---|---|
| $\sigma/\lambda$ | .001 | .003 | .01 | .03 |
| Specular Reflectance/Total Reflectance | | | | |
| $R_s/R_o$ | .9998 | .9986 | .9843 | .8675 |
| Reflectance Error Term | | | | |
| $\Delta R_s/R_o$ | $3.1 \times 10^{-9}$ | $2.5 \times 10^{-7}$ | $3.1 \times 10^{-5}$ | .0025 |

The table also repeats $R_s/R_o$ ratios for different roughness to wavelength ratios. It will be seen that for a ratio less than about 1:120, precision begins to fall off somewhat.

Figure 2:
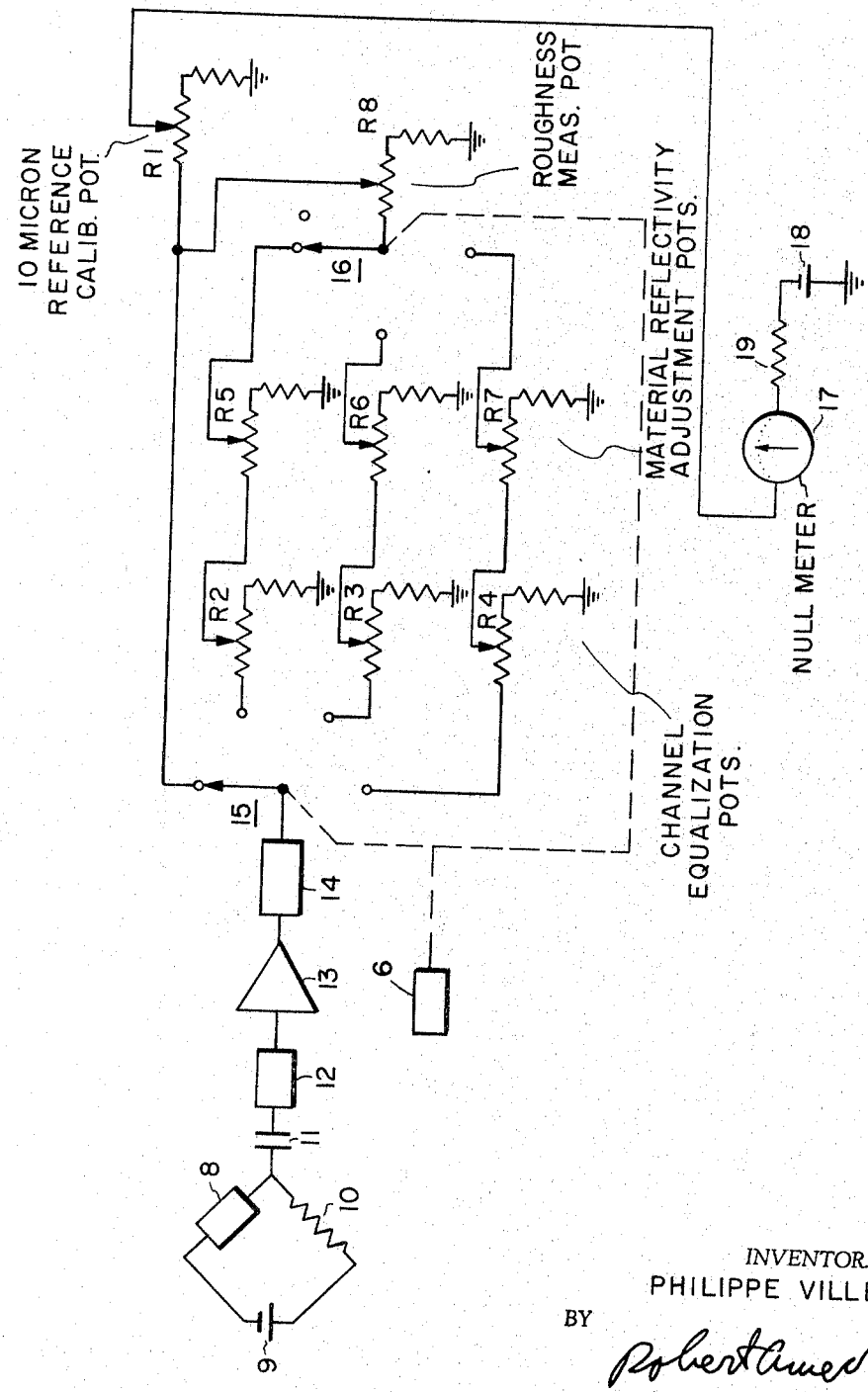

It has been stated that in the present invention, just as in the Dreyfus invention, radiation strikes the sample to be measured at near normal incidence. Table II is for normal incidence. If there is a departure from normal incidence, the error term is increased by a factor which is a function, $\theta$, of the angle of incidence. However, for a few degrees departure from perfectly normal incidence, the error term still remains small enough to be neglected. Therefore, it is not an essential of the present invention that the radiation strike the sample to be measured exactly at normal incidence, and a few degrees departure will be referred to throughout the present application, as in the Dreyfus application, as "substantially normal incidence." The invention will be described in greater detail in conjunction with the drawings, in which:

FIG. 1 is a diagrammatic representation of the optical elements of the invention, and FIG. 2 is a schematic of the electronic circuits for a typical three-range instrument.

In FIG. 1 there is shown a radiation source 1 of about 1 mm.² area with a filament maintained at approximately 1400° K. The resulting radiation is focused by a lens 2 which may advantageously be made of infrared transmitting material known as Irtran-2. This material transmits from the visible through the infrared effectively to $10\mu$ and beyond. Advantageously, the lens may be of about $f/2$ speed. The focused beam is then chopped by a conventional chopper 3 and strikes a beam splitter 4 which should be chosen to operate effectively in a wavelength band of from about $1\mu$ to $10\mu$.

The focused beam is reflected by the beam splitter at normal incidence onto a sample 5 located at the focal point by suitable mechanical or optical focusing means. Reflected radiation passes again through the beam splitter 4, and then through a filter wheel 6 provided with four filters, the first three passing fairly narrow bands of infrared radiation centered at $1.5\mu$, $4\mu$, $8\mu$, and $10\mu$ and beyond. Any particular filter can be brought into engagement by turning the filter wheel 6. The filtered beam is then imaged by a second lens 7, which may conveniently be the same as the first, of Irtran, which is also preferably of high speed, for example about $f/2$, onto a detector 8 which is in the form of a conventional thermistor bolometer or a thermopile.

FIG. 2 shows the schematic of the instrument, the thermistor bolometer 8 being shown in the conventional bridge circuit with a source of bias 9 and a reference thermistor flake 10. In the case of thermovoltaic detectors, such as thermopiles, of course, the bias supply is omitted.

The chopped reflected radiation striking the thermal detector 8 produces an AC signal at chopping frequency, which preferably is different from that of the normal AC line if line-fed amplifiers are to be used. The capacitor 11 removes any direct current signal, and the band-pass filter 12 produces an output at substantially chopping frequency. This output is then amplified in a conventional AC amplifier 13 and is rectified to produce a DC voltage in the rectifier 14.

The DC voltage is fed to a switch deck 15 with four contacts for $10\mu$, $1.5\mu$, $4\mu$ and $8\mu$ respectively. The switch is ganged to the filter wheel 6 which is indicated only as a block on FIG. 2. The switch also has a second deck 16 which will be described below.

The $10\mu$ contact is connected to a potentiometer $R_1$ which, for the ranges shown in Table I, is 300Ω. The potentiometer is connected to ground through a fixed resistor of about 1K. The same contact is also connected to the slider of another potentiometer $R_8$ of 2K, connected to ground through a fixed resistor of 10K.

Contact $1.5\mu$ of deck 15 leads to a potentiometer $R_2$ of 2K connected to ground through a fixed resistor of 10K. In a similar manner contacts for $4\mu$ and $8\mu$ are connected to potentiometers $R_3$ and $R_4$ of the same value for the potentiometer and fixed resistance as $R_2$. The slider of potentiometer $R_2$ connects to potentiometer $R_5$ of 20K value connected to ground through a fixed resistor of 100K. The slider of potentiometer $R_3$ is connected to potentiometer $R_6$ of the same value as $R_5$, and in a similar manner the slider of $R_4$ to potentiometer and fixed resistor $R_7$. The sliders of potentiometers $R_5$, $R_6$ and $R_7$ connect to contacts on decks 16 marked $1.5\mu$, $4\mu$, and $8\mu$ respectively. There is also a blank contact on deck 16 corresponding to the contact for $10\mu$ on deck 15. As the switch is turned, the contacts on deck 16 are successively connected to the end of the potentiometer $R_8$.

The slider of potentiometer $R_1$ leads to a zero-center meter 17 in series with a battery 18. A protective resistor 19 protects the meter from excessive current when it is in a position indicating a value differing from zero.

Calibration of the instrument proceeds as follows: A mirror having high reflectance in the infrared is placed in the sample position 5. The switch is set to the $10\mu$ position, which throws in the $10\mu$ filter on the wheel 6. The reflected radiation produces an output from the bolometer 8 which is amplified and rectified, producing a definite voltage at the contact $10\mu$ on a switch deck 15. All of the potentiometers are turned to full resistance, except $R_8$, which is turned to zero resistance, and the battery 18 is chosen so that its voltage is slightly higher than the highest voltage produced by reflection from the mirror in any of the four bands. As a result, the meter 17 will show a plus reading. Potentiometer $R_1$ is then turned until the meter 17 reads zero. The switch is then turned to the $1.5\mu$ position, which puts the rectified voltage from 14 onto the input of potentiometer $R_1$. The path is through potentiometers $R_2$, $R_5$ and $R_8$. The voltage from contact $1.5\mu$ thus reaches $R_1$ through the resistance of $R_8$.

The filters in the filter wheel 6 are chosen so that the voltages at $1.5\mu$, $4\mu$ and $8\mu$ are substantially, but not too greatly, higher than when the $10\mu$ filter is in place. This ordinarily will mean a relatively wider filter band at $10\mu$, because the 1400° K. radiation peaks just beyond $2\mu$, and the relative energy at $10\mu$ is only .03. The corresponding energies are .8 for $1.5\mu$, 45 for $4\mu$, and .065 at $8\mu$. In order to equalize the energies so that there is not too great difference from that at $10\mu$, the filters for $1.5\mu$ and $4\mu$ must transmit relatively considerably less energy, which can be effected by greater absorption in the filter or by a narrower band, or both. The filter for $8\mu$ is intermediate. All of the filters, however, must pass somewhat more radiation than does the $10\mu$ filter. Since there is more voltage on the potentiometer $R_1$ when the switch is in the $1.5\mu$ position than there was when it was in the $10\mu$ position, the meter 17 will again give a plus reading. Potentiometer $R_2$ is then adjusted until the meter 17 once more reads zero. The switch is then turned to the 4μ position, and the same procedure repeated, adjusting potentiometer R3, and finally the switch is moved to the 8μ position and R4 turned until a null reading is once more obtained.

Various materials have differing reflection characteristics in the infrared, and in some cases the reflective characteristics are different at different wavelength bands. It should be noted that these characteristics are for specular reflectance. The exact ratio of the reflectance of the material as compared to the practically perfect mirror used for calibrating is determined experimentally with precision instruments such as interferometers, and settings of potentiometers $R_5$, $R_6$ and $R_7$ are determined, and tables of values supplied with the instrument. These are the settings for potentiometers $R_5$, $R_6$ and $R_7$. It should be noticed that no material, the roughness of which is to be measured, will have a higher specular reflectance than the calibrating mirror. If it is considerably lower, false readings would be obtained because the roughness is read as a ratio of specular reflectance divided by the observed reflectance of the sample being tested. Therefore, if the specular reflectance is lower, there must be introduced a corresponding attenuation in the potentiometers $R_5$, $R_6$ and $R_7$ respectively. Otherwise we would be measuring the ratio between the specular reflectance of the calibrating mirror and the observed reflectance of a sample which has a different specular reflectance.

Now a sample, the roughness of which is to be measured, is introduced at 5. Let us say that it is a stainless steel sample. Potentiometers $R_5$, $R_6$ and $R_7$ are set to the values which have been determined for the specular reflectance of stainless steel, and the switch turned to the 1.5μ position. Since the potentiometer $R_8$ is turned all the way to the right, which corresponds to a position for zero roughness, that is to say, for specular reflection, the voltage reaching the meter 17 will be lower than that of the battery, and the meter will give a negative reading. Thereupon, potentiometer $R_8$ is turned until the meter once more reads zero. If a null reading is obtained, the roughness is read off from the corresponding scale on the dial of potentiometer $R_8$. It will be noted that this dial will carry three different scales, one for 1.5μ, one for 4μ, and one for 8μ. The scales, of course, will show different ranges of values of roughness. Let us assume further, in another case, that it is not possible to null the meter on the 1.5μ range. The switch is then turned to the 4μ range, and it is again attempted to null the meter by turning of potentiometer $R_8$. If this proves successful, the roughness is read off on the 4μ scale on the dial of the potentiometer $R_8$. If nulling still cannot be obtained, the switch is then turned to 8μ and the potentiometer $R_8$ adjusted until the meter reads zero. The reading of the roughness will then be determined by the 8μ scale on the dial. If the meter still cannot be nulled, then, by noting the direction of the needle, one can determine whether the sample is above or below any one or all of the instrument's three ranges.

It will be noted that the present instrument has broken the range of roughness from .5 μin. to 10 μin. into three ranges, and optimum measuring conditions are obtained. It is theoretically possible to design an instrument that would go down considerably lower in RMS roughness, for example, to .1 μin. However, in such a case, if it were attempted to retain precision, one would have to use radiation of .3μ, which is in the ultraviolet. It would be possible to work with visible radiation in the blue or blue-violet with fair precision, but in such a case it would be necessary to substitute a different light source, as the amount of energy from a 1400° K. source at .3μ or .4μ is inadequate. Also, problems of optical aberration enter the picture. It is almost impossible to design dioptric optics which will give sharp imaging over such an enormous wavelength range. It is, of course, possible to use catoptric optics, and such elements are not excluded from the present invention, but the resulting increased size and complexity reduce, to a considerable extent, the practical desirability of the instrument. In general, if a wider range of RMS roughness is to be measured, it is preferable to design separate instruments for different combinations of ranges. In each case, however, the advantages of the present invention, which give direct reading, compact instrumentation, and complete compensation for different materials, are retained. Since the range from .5 μin. to 10 μin. is the range in which precise measurements are most important and are least obtained with other instruments, the instrument shown in the drawings is a preferred one for practical use.

The values of resistances and potentiometers in FIG. 2 are simply typical. They operate satisfactorily, but the invention is in no sense limited to the values set forth. Of course, if there are changes made in the potentiometer $R_8$, the relative resistances must be in proper proportion, or different scales must be provided. This is, of course, merely a design problem which can be routinely solved, and the present invention is therefore not limited to any particular scales or any particular exact values of circuit components. The fact that there is a wide choice of design is an advantage of the present invention. There is no limitation to critical component values.

No instrument can be used continuously without change in some of its characteristics. For example, the light source may change with age, filter transmissions may vary, and the like. It is an advantage of the present invention that calibration with a mirror is effected so quickly that the instrument can be recalibrated at reasonably short intervals without significant loss of time, and without requiring auxiliary equipment, except for the high-quality calibrating mirror, which is required in any event for the initial calibration.

The instrument has been described with a thermistor bolometer as the reflected radiation detector. A very satisfactory and reliable instrument results, but, as has been pointed out above, the nature of the radiation detector is not in any way critical. However, the radiation detector must be capable of responding to chopped radiation, and if a thermopile is used, which is also a very satisfactory type of radiation detector, it must be capable of rapid heating and cooling, and for this purpose a solid-backed thermopile is preferred. In this thermopile the active junctions are separated from, and if necessary, insulated from a heat sink substrate of high thermal conductivity, such as a metal substrate. These improved solid-backed thermopiles do not, per se, form any part of the present invention. When thermopiles are used in place of a thermistor bolometer, no extensive changes are required in the instrument. Of course, the battery which biases the bolometer is unnecessary, and the electronics must have a low impedance input to match the corresponding low impedance of the thermopile.

I claim:

1. In a surface roughness measuring instrument in which the roughness is measured by reflection from the sample the roughness of which is to be measured at substantially normal incidence of a beam of radiation having a wavelength at least ten times and preferably at least thirty times as long as the roughness of the sample, the improvement which comprises in combination,
    (a) means for locating a sample, the roughness of which is to be measured, means for producing a chopped beam of radiation and for focusing it onto the sample at substantially normal incidence,
    (b) a selective wavelength single-color radiometer positioned to receive the focused radiation reflected from said sample and provided with means for selecting a plurality of wavelength bands, a radiation detector capable of transforming chopped radiation into AC electrical output, and means for focusing said reflected radiation onto the radiation detector,
    (c) electronic processing means connected to the output of the radiation detector and including AC amplifying means and rectifying means to produce a DC output in the form of a voltage, (d) a null reading meter at a predetermined point on its scale, one end of the meter being connected to a DC potential and the other end to the DC voltage output from the rectifying means, (e) means for switching the DC voltage to various circuits for different selected radiation band widths, (f) means for varying the voltages at the output of said circuits and means for compensating for varying spectral reflectance of different materials, (g) attenuating means connected between the outputs of said circuits and the input to an attenuator the output of which is connected to the null meter whereby said first attenuator serves as a roughness measuring device.

2. In a surface roughness measuring instrument in which the roughness is measured by reflection from the sample the roughness of which is to be measured at substantially normal incidence of a beam of radiation having a wavelength at least ten times and preferably at least thirty times as long as the roughness of the sample, the improvement which comprises in combination, (a) means for locating a sample, the roughness of which is to be measured, means for producing a chopped beam of radiation and for focusing it onto the sample at substantially normal incidence, (b) a selective wavelength single-color radiometer positioned to receive the focused radiation reflected from said sample and provided with means for selecting a plurality of wavelength bands, a radiation detector capable of transforming chopped radiation into AC electrical output, and means for focusing said reflected radiation onto the radiation detector, (c) electronic processing means connected to the output of the radiation detector and including AC amplifying means and rectifying means to produce a DC output in the form of a voltage, (d) a null reading meter at a predetermined point on its scale, (e) means for successively switching the DC voltage to various circuits for different selected radiation band widths on the detector, one switch contact being directly connected to an attenuator, the output of which is connected to the null meter, said attenuator being of the type which applies varying proportions of the said DC voltage to the meter, (f) a second attenuating means the output of which is connected to the input of the first attenuating means, (g) a plurality of circuits each containing two adjustable ratio voltage attenuating means in series, the second attenuating means in each circuit being provided with an adjustment indicating means whereby each of said attenuators in each circuit can be set to predetermined values determinable by the specular reflectance characteristics of different materials of which the samples are constituted, (h) a second switching means operating in synchronism with the first switching means to switch successively the outputs of the circuits containing two series attenuators to the input of the second attenuator, whereby, when a mirror for the longest wavelength band is inserted in the sample location, the first attenuating means can be adjusted for predetermined meter null point readings, the switch switched to one of the band positions, and with the second attenuator adjusted for maximum attenuation and one of the two series attenuators in the circuit for the band pass position set at minimum attenuation, the meter can be set to null reading by adjustment of the other attenuator in the circuit which acts as a channel equalization attenuator, the calibration procedure can be repeated for the other switch positions and then a roughness sample introduced into the sample location and the sample characteristic attenuators set for predetermined sample material specular reflectance characteristics and the second attenuator adjusted to meter null reading on whichever bands permit nulling by the second attenuator, and (i) indicating means actuated by the adjustment of the second attenuator to read directly sample roughness.

3. An intrument according to claim 2 in which the attenuators are potentiometers in series with fixed resistors.

4. An instrument according to claim 2 in which the null meter is connected to a source of reference voltage in opposition to the voltage from the output of the first attenuator.

5. An instrument according to claim 2 in which the null meter is connected to a source of reference voltage in opposition to the voltage from the output of the first attenuator.

6. An instrument according to claim 3 in which the null meter is connected to a source of reference voltage in opposition to the voltage from the output of the first attenuator.

References Cited

UNITED STATES PATENTS 3,222,978   12/1965   Dreyfus _____ 88—14

JEWELL H. PEDERSEN, *Primary Examiner.*

B. LACOMIS, *Assistant Examiner.*